Patented Apr. 19, 1927.

1,625,360

UNITED STATES PATENT OFFICE.

MAX HARTMANN, OF BASEL, SWITZERLAND, ASSIGNOR TO SOCIETY OF CHEMICAL INDUSTRY IN BASLE, OF BASEL, SWITZERLAND.

MANUFACTURE OF PHYSIOLOGICALLY-ACTIVE SUBSTANCES FROM OVARIES, CORPUS LUTEUM, AND PLACENTA.

No Drawing. Original application filed April 14, 1924, Serial No. 706,593, and in Switzerland May 8, 1923. Divided and this application filed August 5, 1926. Serial No. 127,474.

This is a division of my application for Letters Patent filed April 14, 1924, Ser. No. 706,593, to which corresponding applications have been filed as follows: Switzerland, May 8, 1923; Germany, December 17, 1923; Great Britain, December 29, 1923.

In the United States Patent No. 1,314,321 there is described a process for the manufacture of new hormones from ovaries, corpus luteum and placenta, consisting in dissolving from animal tissue, by means of a volatile solvent, the hormones, phosphatides, fats, cholesterol and esters of cholesterol, together with other material soluble in the solvent used, thereafter separately separating the phosphatides and the hormones from the mother liquor, freeing the hormones from fats, cholesterol and esters of cholesterol whereby the hormones are isolated. A particular form of the process consists in distilling in a vacuum the extract which has been freed from phosphatides so as to isolate the hormones.

In the copending application Ser. No. 706,593 there is described the manufacture in highly concentrated form of the hormones from female internal secretory organs by subjecting the extracts obtained as indicated in the United States Patent No. 1,314,321 or by any analogous process to the action of low temperature.

It has now been found that the hormones described in the above named Patent No. 1,314,321 may also be obtained in a particularly highly purified form by subjecting the extracts obtained as indicated in the aforesaid patent or by any analogous process to a treatment with basic lead acetate.

It is known to purify extracts of female internal secretory organs by precipitation with normal lead acetate. According to the present invention inactive admixtures which cannot be separated by a treatment with normal lead acetate may be removed from purified active extracts from placenta, ovaries or corpora lutea by precipitation with basic lead acetate.

The operation may consist in dissolving in a suitable solvent, such as acetone or methyl alcohol, the not distilled highly purified extract, or the total distillate, and precipitating by means of a solution of basic lead acetate.

A further quantity of indifferent material may be removed if this process is combined with a treatment at low temperature. Thus e. g. an extract treated with basic lead acetate, as described in the foregoing paragraph, may be further purified by cooling it to temperatures below 0° C., preferably to —50° to —70° C. e. g. by means of a mixture of ether and solid carbon dioxide.

The precipitation with basic lead acetate and the freezing may be conducted simultaneously, or may take place separately whereby the treatment at low temperature may either precede or follow the precipitation with basic lead acetate.

The purification may be undertaken at any desired phase of the known processes. For example, the method may be applied to a crude extract or to an extract more or less purified by any process, or to a distillate from the vacuum distillation described in the aforesaid patent. Equally for instance the treatment with lead acetate may be conducted before the vacuum distillation and the freezing after this operation, or vice versa.

The extract freed by filtration from the separated matter which consists of neutral fats, cholesterol and its esters, easily soluble phosphatides and their lead salts as well as fatty acids and other substances, yields after distillation of the solvent and elimination of the lead an oily mass that may be used in this form or may be fractionally distilled in a high vacuum for the purpose of isolating the pure hormone.

The following examples illustrate the invention, the parts being by weight:—

*Example 1.*

10 kilos of human placenta are carefully dried in a vacuum at low temperature and then thoroughly pulverized. The dry substance thus obtained is then immediately extracted with ether or a similar volatile solvent in a completely exhaustive way. After the evaporation of the solvent, the phosphatides are precipitated from the residue by four times its weight of acetone. The precipitate is filtered off and the filtrate freed from the solvent under diminished pressure. The residue is dissolved in about twenty times its weight of methyl alcohol of 90 per cent strength and the solution is mixed with a solution of basic lead acetate until no further precipitation occurs. In order the better to recognize this point animal charcoal may be added at the same time so as to adsorb the colloidal precipitate. (The lead solution required for the precipitation may be made by boiling 1 part of lead acetate and 1 part of lead oxide with 10 parts of methyl alcohol until the lead oxide has almost completely dissolved). When the precipitation, which is advantageously conducted while cooling, is complete, the liquid is filtered from the animal charcoal and lead precipitate and from the clear solution the greater part of the methyl alcohol is distilled in a vacuum (after addition of some glacial acetic acid) and the residue is diluted with water. The active material thus obtained is dissolved in ether or some other solvent insoluble in water. After the solution has been dried and the solvent evaporated the active material may be distilled in a high vacuum or used directly.

*Example 2.*

50 grams of a highly purified extract of placenta are dissolved 500 ccm. of acetone and the solution is mixed with 100 ccm. of a solution of basic lead acetate obtained by boiling lead oxide with normal lead acetate in methyl alcohol. The whole liquid is now cooled to —60 to —70° C. and maintained at this temperature until there is no further separation. The precipitate is filtered on a suitable apparatus and the solvent is distilled after separation of the excess of lead. There remains a bright, clear oil which represents the active substance in a highly concentrated form.

What I claim is:

1. A process for the manufacture in highly concentrated form of the hormones from female internal secretory organs by subjecting extracts of said organs obtained by any process to the action of basic lead acetate, thereby precipitating out the inactive matter.

2. A process for the manufacture in highly concentrated form of the hormones from female internal secretory organs by subjecting extracts of said organs obtained by any process in any sequence to the combined action of basic lead acetate and of low temperatures, thereby precipitating out the inactive matter.

3. A process for the manufacture in highly concentrated form of the hormones from female internal secretory organs by subjecting extracts of said organs obtained by any process in any sequence to the combined action of basic lead acetate and of temperatures below 0° C., thereby precipitating out the inactive matter.

4. A process for the manufacture in highly concentrated form of the hormones from female internal secretory organs by subjecting extracts of said organs obtained by any process in any sequence to the combined action of basic lead acetate and of temperatures ranging between —50° to —70° C., thereby precipitating out the inactive matter.

In witness whereof I have hereunto signed my name this 23rd day of July, 1926.

MAX HARTMANN.